Sept. 19, 1939.　　　L. E. PERRINE　　　2,173,661

VARIABLE SPEED DRIVE

Filed Nov. 22, 1933

Inventor
Lester E. Perrine
By Blackmore, Spencer & Flint
Attorneys

Patented Sept. 19, 1939

2,173,661

UNITED STATES PATENT OFFICE 2,173,661

VARIABLE SPEED DRIVE

Lester E. Perrine, Detroit, Mich., assignor, by mesne assignments, to General Motors Corporation, Detroit, Mich., a corporation of Delaware Application November 22, 1933, Serial No. 699,155

17 Claims. (Cl. 123—171)

This invention relates to variable speed drives and is adaptable to numerous relations such as the transmission of automobiles, but more particularly to the fan drives of automobiles, etc.

In the practicable embodiment of the invention, shown herein as applied to the drive of an engine fan, use is made of a plurality of expandible and contractible cone pulleys which have a V-belt driving the one pulley from the other. The pulleys are so constructed that as one expands, the other will contract, this expansion and contraction taking place without the intervention of manual or other outside means so that the belt tension is maintained constant and without slip. This expansion and contraction of the pulleys, of course, will cause the V-belt to work on different pitch diameters and produce changes in the relative speeds of the two shafts on which the pulleys are mounted. The drive has the combination of a torque responsive device on one pulley and a spring or equivalent compensator on the other. The purpose of this combination is to enable the torque responsive device positively to dominate at greater torque, and the compensator to control at greater speeds in the determining of ratio between the fan and engine shafts.

A practicable adaptation of the speed drive is that used in connection with the fan used to draw air through the radiator of the cooling system of the conventional internal combustion engine used on automotive vehicles. It is well known that at slow speeds it is advisable to have a greater volume of air pass through the radiator to effect adequate cooling than is required at high speeds when the motion of the vehicle will cause a greater amount of air to pass through the radiator, so that when higher speeds (such as forty miles per hour) are reached, the fan may be cut out entirely and still adequate cooling obtained. In the present invention the pulley mechanism is so designed that when the speed of the driving pulley corresponds to a car speed of twenty miles per hour or more, the pulley diameters will change to cause the fan to be driven at its slowest speed ratio, which is below one-to-one. This is of advantage for the reason that the fan now takes less power from the engine, enables more power to be used to drive the vehicle, and therefore adds to fuel economy.

On the drawing

Figure 1:
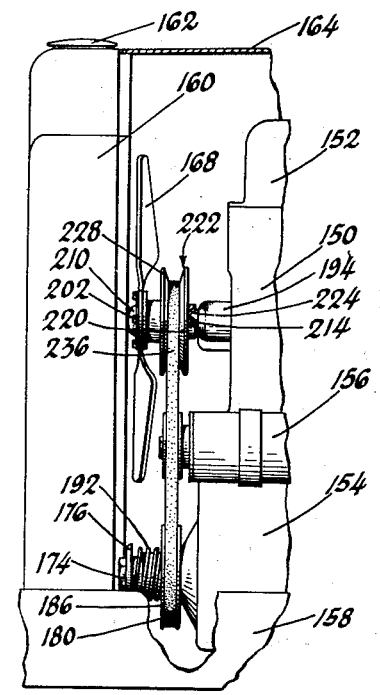
Figure 1 is a side view of a portion of an automotive vehicle showing the application of the invention to an engine fan drive.

Figures 1 to 7 inclusive show the invention of the variable speed drive for the fan of an internal combustion engine. In Figure 1 the numeral 150 designates an internal combustion engine having the cylinder head 152, the crank case and oil pan 154 and the generator 156. The engine is mounted in the usual chassis frame 158. Likewise mounted upon the chassis frame is the usual radiator enclosed in the shell 160 and having the filler cap 162 to close the filler opening. The hood is indicated at 164. The engine has the usual propeller shaft 166 and the usual fan 168. These parts are conventional, and per se form no part of the invention except insofar as required to demonstrate the particular features thereof and herein described and claimed.

Figure 2:
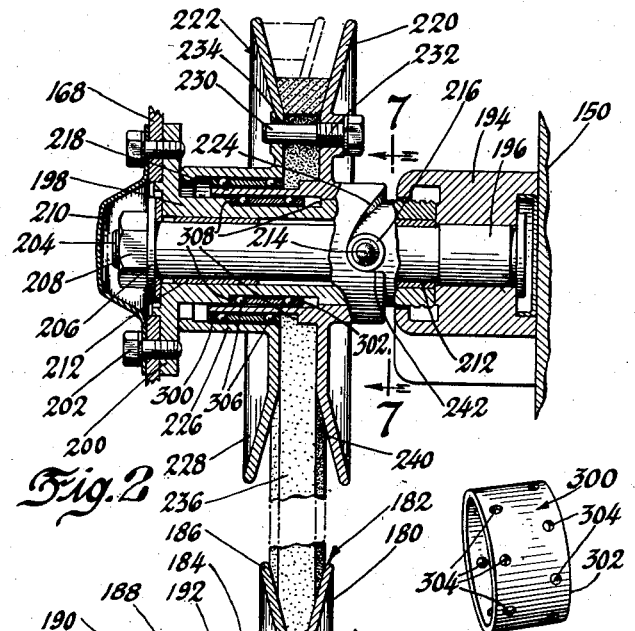
Figure 2 is an enlarged sectional detailed view of the drive shown in Figure 1.

Referring to the enlarged sectional view in Figure 2, the crank shaft 166 has a reduced threaded end 170 on which there is screw threaded the sleeve 172 having a head 174 which retains in position the washer 176 and a hub 178 of the non-shiftable side 180 of a cone pulley indicated as a whole at 182. The sleeve 172 rigidly secures the washer 176 and the hub 178 to the crank shaft 166 so that these parts always turn therewith.

Slidably mounted on the hub 178 is a hub 184 on the shiftable side 186 of the pulley 182. The hub 184 has a pin 188 rigid therewith which projects into and slides in a groove 190 in the hub 178. A compression coil spring 192 is confined over the hubs 178 and 184 and between the washer 176 and shiftable side 186 of the pulley 182 and constantly urges the shiftable side 186 toward the non-shiftable side 180 with sufficient force to prevent slip at all times.

Referring to the upper portion of Figure 2, the engine block 150 has attached thereto a support 194 in which there is rigidly mounted a shaft 196 which projects forwardly of the engine block toward the radiator. Turnably mounted on the shaft 196 is the hub 198 which has a flanged end 200 to which the fan 168 is secured by means of the machine bolts 202. The outer end of the shaft 196 is reduced and threaded as at 204 and a washer 206 and nut 208 retain the hub 198 on the shaft 196. A lubricant retaining and dust excluding cover 210 is secured by means of the machine bolts 202 over the outer end of the shaft 196. Suitable bearings 212 are positioned between the shaft 196 and the hub 198.

Figure 3:
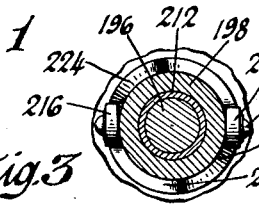
Figure 3 is a detailed sectional view on the line 7—7 of Figure 2.

Toward the inner end of the hub 198 rollers 216 are turnably mounted on the pin shafts 214. As best shown in Figure 3, there are two rollers at diametrically opposite points.

Turnably mounted on the hub 198 is the hub 218 which has integral therewith the shiftable side 220 of the driven pulley 222. The end of the hub 218 adjacent the rollers 216 is provided with two cams 224, the surfaces of which are adapted to ride on the rollers 216 to cause the hub 218 to be shifted to the left or to move the side 220 from the full line position in Figure 2 to the dotted line position. The cams 224 and rollers 216 act as a torque responsive device when the variable speed drive is in motion.

Over the hub 218 there is freely mounted the hub 226 of the non-shiftable side 228 of the pulley 222. Pins 230 have threaded shoulders 232 threaded into suitable openings in the movable pulley side 220 and extend into openings 234 in the stationary side 228. As many pins as desired may be used.

The operation of the structure of Figures 1 to 3 and 7 inclusive is as follows: the crank shaft 166 will turn the hub 178 and the pulley side 180. The pin and groove connection 188, 190 will cause the rotation of the pulley side 186 with the pulley side 180. The rotation of the pulley 182 will drive the V-belt 236 which corresponds to the cone shape of the sides of the pulleys 182 and 222 and fits in the gorges 238 and 240 of the pulleys. The driving of the belt 236 will cause the turning of the pulley 222 and the rotation of the fan 168. After the engine speeds up, and due to the tendency of the fan to lag behind the drive due to the friction of the belt, the inertia of the fan assembly and the air resistance; the cam 224 will ride on the roller 216 to cause the hub 218 to move to the left (Figure 2) to cause the shiftable side 220 of the pulley to move from the full line position toward the dotted line position. This movement will cause the belt to tighten and to spread the lower pulley 182, or to force the shiftable side 186 from the full line position toward the dotted line position against the force of the spring 192. As the speed increases under air resistance to the rotation of the fan, the belt will finally be forced to the position in which it will be at the bottom of the gorge 238 of the lower pulley and the top of the gorge 240 of the upper pulley 222. In this position there will be the slowest rotation of the fan for the greater speed of the engine. This corresponds to low ratio for the variable speed drive. It must be borne in mind, of course, that the force of the torque responsive device comprising the roller 216 and the cam 224 is much greater than the resistance offered by the compression spring 192. As the engine slows down, inertia will cause the fan to continue to move faster than the engine. The rollers 216, which are rigid with the hub on which the fan is mounted, will move toward the lowermost portion of the cam or against the surface indicated at 242. When the surface 242 moves toward the roller 216, the belt will easily be able to push the shiftable side 220 to the right and simultaneously the spring 192 on the pulley 182 will push the shiftable side 186 to the right to compensate for the expansion of the upper pulley 222. The belt will therefore remain tensioned at all times without slip. The full line position of the belt and pulleys in Figure 2 indicates the position at starting and low speeds. In this position the maximum diameter is on the lower pulley and the minimum diameter on the upper pulley. Therefore, in the starting position, or when the most cooling air is needed, the fan is driven at its highest speed proportional to the speed of the engine. This, of course, is predicated on the velocity of the vehicle, since the air blast met by the fan will reduce the torque felt by the cam-and-roller device 216—224 and allow spring 192 to shift pulley 186—182 toward higher ratio. At higher engine speeds the variable speed drive will change the effective or pitch diameters of the pulleys and decrease the amount of power necessary to drive the fan by proportionately decreasing the fan speed.

Figure 4:
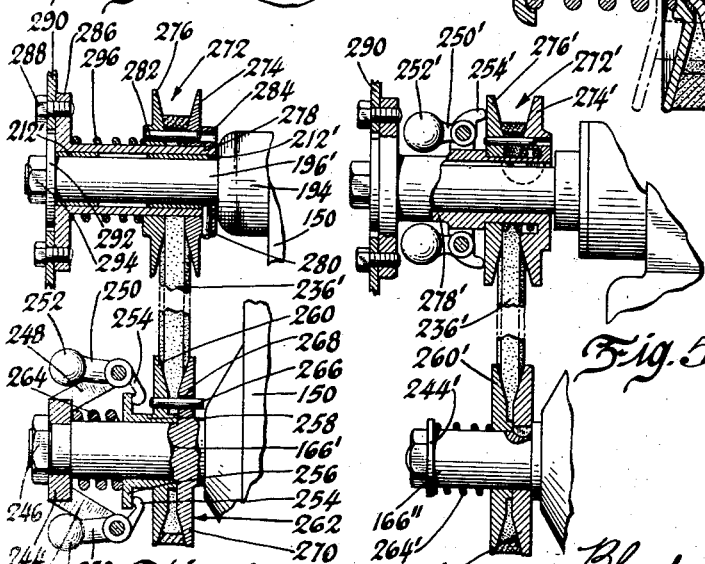
Figures 4 and 5 are sectional views corresponding to Figure 2 of modifications.

Figure 4 is a modification of the structure of Figures 1 to 3. The end of the crank shaft 166' is differently constructed. It has a reduced end to receive a collar 244 rigidly secured to the crank shaft by means of the nut 246 threaded on a reduced end of the shaft 166'. The collar 244 has integral therewith two diagonally extending arms 248 to which there are pivoted the bell cranks 250. One end of each bell crank has a weight 252 while the other end has a hook 254. The hooks 254 engage behind a collar 256 secured to the hub 258 of the shiftable side 260 of a cone pulley indicated as a whole at 262. A compression spring 264 is confined between the collars 244 and 256 and constantly urges the hub 258 to the right (Figure 4).

The shiftable side 260 has secured thereto the pin 266 which extends through an opening 268 in the stationary side 270 of the pulley 262. The stationary side 270 is shown as formed integral with the crank shaft, but if desired it may be formed on a separate hub which is rigidly secured to the shaft. A V-belt 236' is entrained over the pulley 262 and over an upper pulley 272. The upper pulley has the non-shiftable side 274 and the shiftable side 276. The non-shiftable side is rigidly secured to the hub 278 by means of the pin 280 while the shiftable side 276 is slidable on the hub 278. A pin 282 secured to the movable side 276 extends through an opening 284 in the rigid side 274 to compel the two sides to move together. The hub 278 is mounted on the shaft 196' and suitable bearings 212' are positioned between the shaft and the hub. The outer portion of the hub 278 has the flange 286 to which there is secured by the machine bolts 288 a fan 290. A washer 292 and nut 294 hold the hub 278 on the shaft 196'.

The operation of the structure of Figure 4 is as follows: the levers 250 and the weights 252 form centrifugal weights. As the speed of the engine shaft 166' increases, the weights 252 will move outwardly and thereby cause the hooks 254 to move the flange 256 to the left to compress the spring 264 and to expand the pulley 262 by pulling the movable side 260 to the left. This expansion of the pulley will cause the belt 236' to ride deeper into the gorge between the sides and as the belt receives an increment of slack, the upper spring 296 will push the movable side 276 of the pulley 272 to the right to cause a contraction of the pulley. This expansion of the lower pulley and contraction of the upper one will cause a decrease in the ratio in the relative speeds of the two shafts, the shift occurring gradually without slip. In other words, at lower engine speeds where air is needed through the radiator, the fan 290 is driven at a higher speed because of the fact that the lower pulley diameter is much greater than the upper pulley diameter. At higher engine speeds and when less air is needed through the radiator, the variable speed drive will compensate by causing the lower pulley to expand to give a smaller effective pulley diameter and the upper pulley to contract to give a greater effective pulley diameter and cause a diminishing in the ratio of the relative speeds of the shafts. It should be emphasized that the invention provides a full scale of ratio shift between overdrive and underspeeds.

Figure 5:
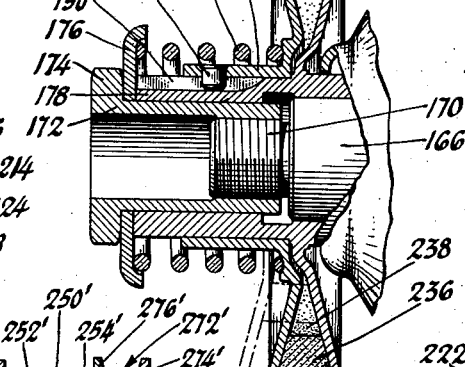

Figure 5 differs from Figure 4 in that the centrifugal weights are placed on the upper or driven shaft, the weights acting in the opposite direction to the weights of Figure 4. The bell crank lever 250' has the weighted ends 252' and the hook ends 254'. These weights are pivoted to the hub 278' to which the non-shiftable half 274' of the pulley 272' is attached. As the engine speed increases, the weights 252' will move outwardly to cause the hooks 254' to press the shiftable side 276' toward the non-shiftable side 274' to decrease the diameter of the pulley. This decrease in the diameter of the pulley will cause the belt 236' to spread or expand the lower pulley 262' by causing the shiftable side 260' to move to the left to compress the spring 264', confined on the crank shaft 166'' between the shiftable pulley side 260' and the collar 244'.

Figure 6:
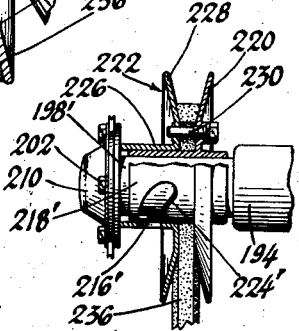
Figure 6 is a detailed sectional view of a further modification.

Figure 6 shows a modification of the cam and roller type species shown at the upper portion of Figure 2. Parts which correspond to the identical parts in Figure 2 are similarly numbered. The hub 218' instead of having the cam 224 has the cam slot 224' against the sides of which the rollers 216' are adapted to bear. The rollers 216' are rotatably secured to the hub 198'. Preferably there are two cam slots 224' and two diametrically opposite rollers 216'. The operation of the device of Figure 6 is no different from the operation of the device of the upper portion of Figure 2. The sole difference resides in the change in position and shape of the roller 216 and cam 224 of Figure 2.

Figure 7:
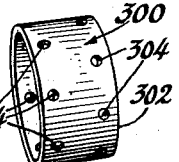
Figure 7 is a perspective view of the bearing used with the invention.

Referring to Figures 2 and 7, it will be noted that a bearing 300, shown in perspective in Figure 7, is used to facilitate the sliding movement of the movable sides of the pulleys. The bearing comprises the cylinder 302 having a plurality of openings 304 at its two ends. These openings are slightly oversize, and receive therein balls 306 which have a diameter which is greater than the thickness of the cylinder 302. When the movable side of the pulleys is shifted, it will roll on the balls 306 and move the bearing 300 therewith, the bearing moving one half the distance moved by the movable half of the pulley. Suitable shoulders 308 are provided to limit the movement of the bearing 300.

The bearing 300 is shown as applied to the upper part of Figure 2 only, although it is used with the movable half of the pulleys of the structures of all the figures. The bearing is not shown in the other figures for purposes of clearer illustration and to avoid the necessity of applying a large number of numerals.

The bearings 300 do not serve as bearings for the pulleys when they rotate. In Figure 2, for instance, the bearing 212 receives the bearing stresses of the pulley when it rotates, the bearings 300 rotating with the pulley.

It must be borne in mind that the invention herein fulfills these important functions; the maintaining of the driving belt tight at all times, the holding of the speed ratio in overspeed at low initial engine and vehicle speeds, the shifting of the ratio to underspeed under fan torque in excess of predetermined values, and the further tendency to overspeed ratio shift when the vehicle velocity reaches given values. This is distinct from drives in which fan speed ratio is changed from one-to-one to reduction, for example.

The invention embodies means to drive the fan at an overspeed ratio when the engine is at low speeds, to prevent overheating, and to drive it at underspeed ratio when the engine is at higher speeds with the fan torque valve high, and inherent in the means to perform these acts, is the slip prevention factor, without which, the normal surges of acceleration and deceleration of the engine would tend to keep the structure in a constantly slipping condition when excessive belt wear would occur. The invention further makes an important contribution to fuel economy in that the horsepower loss at high engine speeds is definitely reduced, since the vehicle velocity air blast reduces the fan torque, and the compensation system in the pulley control shifts to an economical drive ratio with respect to accessory horsepower drain.

While various constructions of the improved power transmitting and change speed apparatus for engine fan drives have been described above, in their essentials, it will be understood that other arrangements of parts and details can be introduced in their design that are within the ambit of the invention as set forth in the following claims. It will be obvious that details may be embodied in such a manner that best suits the purposes of the individual designer, without departing from the scope of the invention as outlined in the accompanying claims.

I claim:

1. In an automotive vehicle having a propelling motor, a fan for cooling said motor and means for driving a fan from the motor at a substantially constant speed independent of any variations in the speed of the propelling motor, said means comprising a pair of parallel shafts, one driven by the motor and the other secured to the fan, a pair of expansible and contractible pulleys, one on each shaft, friction driving means entrained over the pulleys, spring means acting on one pulley tending to maintain it in its closed or largest diameter position while stressing said pulleys and said belt to eliminate slip and speed responsive means acting upon the second named pulley to vary the effective diameter thereof dependent upon the speed of the shaft to which said second pulley is connected whereby as said speed increases the pulley diameters will be varied to maintain the speed of the fan shaft substantially constant.

2. In an automotive vehicle having a motor power plant, a fan for cooling said plant, a rotating shaft upon which the fan is mounted, a shaft parallel to the first shaft carried and driven by the power plant and means for driving the fan shaft at substantially constant speed from the second shaft comprising an expansible and contractible pulley on each shaft, friction means entrained over the pulleys for transferring power from one shaft to the other, spring biasing means acting on one of the pulleys tending to maintain constant tension without slip between said means and said pulleys and holding said pulley in closed position, and means affected by change in speed for positioning the second named pulley sides at different positions, whereby the speed of the fan shaft is maintained substantially constant while the engine speed varies between overspeed and underspeed ratio therewith.

3. In cooling systems for power plants, in combination, an internal combustion engine, a cooling fan for said engine, a variable speed drive for said fan deriving power from rotation of said engine, including continuously variable mechanism effective to drive said fan at speed ratios lesser and greater than one-to-one with respect to the speed of said engine, means to prevent slip in the drive of said mechanism likewise effective to establish a tendency therein to change the speed ratio to greater than one-to-one when the engine is operating at a relatively low speed, and means responding to the resistance to rotation of said fan operative to change the ratio of said mechanism to less than one-to-one ratio when said engine is operating at speeds above a given low speed range, whereby the cooling effect of said fan is greatest at low engine speed ranges, and lesser when said engine is operating at relatively higher speeds.

4. In a variable speed ratio drive between the cooling fan and a driving portion of an internal combustion engine, two expansible and contractible pulleys one driving, the other driven; tensioning means effective to maintain said belt in non-slipping contact with said pulleys at all times; control mechanism operative to regulate the effective drive diameters of said pulleys between ratios greater and lesser than one-to-one ratio, and to hold said pulleys in high ratio a low speeds of said driving pulley; said means being likewise operative to shift said pulleys to low speed ratio when the torque applied to the said driven pulley has reached a predetermined value.

5. In a variable speed drive such as described in claim 4, the sub-combination of means within the said mechanism tending to shift the speed ratio of said pulleys toward high ratio when the torque applied to said driven pulley diminishes.

6. In motor vehicles, in combination, an engine, a cooling fan for an engine, a variable speed drive connecting a shaft of said engine with a shaft of said fan for driving the fan at faster and at slower speeds than the speed of said engine, driving mechanism embodied in said drive comprising two expansible and contractible pulleys, a V-belt entrained in said pulleys to drive the one from the other, a spring adapted to exert a contraction force upon one of said pulleys for maintaining said belt in tension without slip and for exerting a constant tendency to cause said V-belt to move over said pulley at maximum diameter for driving said fan at overspeed ratio, a pin-and-groove connection on the other of said pulleys operative upon an increase in speed to enable said pulley to expand to cause the belt to work on a smaller diameter on the first named pulley and thereby drive said fan at reduction speed ratios, and means on the second of said pulleys to cause it to contract substantially simultaneously with the expansion of the first named pulley to cause the belt to work on a larger diameter thereby facilitating the shift toward overspeed ratio, said means, said spring and said pin-and-groove connection being independent of manual control.

7. In motor vehicles, in combination, an engine, a cooling fan for the engine, a variable speed drive coupling said engine and said fan for driving said fan at overspeed and underspeed ratios, said drive embodying two expansible and contractible pulleys, a V-belt entrained in said pulleys to drive the one from the other, a spring for normally urging said pulleys to shift to overspeed drive, a pin-and-groove driving connection associated with said pulleys operative upon an increase in speed to enable the pulleys to shift readily to underspeed ratio, a torque responsive device operative upon said pulleys to cause the ratio to shift so that one pulley contracts substantially simultaneously with the expansion of the other pulley; said torque responsive device, said spring and said pin-and-groove connection being independent of manual control.

8. In motor vehicles, in combination, an engine, an engine shaft, a cooling fan, a shaft for said fan, a device for transmitting rotational forces between said shafts in which the speed of the fan is to remain substantially constant during higher or lower speeds of said engine shaft, pulleys mounted on each shaft, each pulley comprising axially movable and non-movable sides, a friction belt constantly coupling said pulleys without slip, resilient and speed change responsive means mounted on one of said shafts and operably connected to the adjacent movable side of the pulley on said shaft, and resilient means mounted on the other of said shafts urging the movable side of the other of said pulleys in one axial direction whereby the fan shaft speed tends to remain substantially constant throughout variations in the engine shaft speed.

9. In motor vehicle cooling systems, an engine shaft, a cooling fan shaft, a continuously variable drive constantly coupling said shafts, pulleys on each of said shafts each having a fixed and a movable disc, all of said discs being compelled to rotate at unitary speed with their respective shafts, a belt coupling said pulleys, a biasing spring arranged to exert a continuous force on the movable disc of one of said pulleys tending to hold the drive in overspeed ratio while simultaneously preventing slip between said belt and said pulleys, whereby the said fan is driven at high speed when the engine shaft speed is low; and an automatic ratio shifting device adapted to oppose the action of said biasing spring and to shift one of the movable discs of one of said pulleys when the speed of the engine shaft is high, to a lower than one-to-one ratio so that the fan shaft speed will be low when the engine shaft is rotating at high speed.

10. In a construction such as described in claim 9, the subcombination of an automatic device responding to the torque of the fan shaft and capable of compelling the ratio of drive to remain indefinitely in reduction or underspeed ratio.

11. In a construction such as described in claim 9, the sub-combination of an automatic device responding directly to centrifugal force created by the speed of rotation of the engine shaft.

12. In a construction such as described in claim 9, the sub-combination of an automatic device responding directly to centrifugal force created by the speed of rotation of the fan shaft.

13. In a construction such as described in claim 3, the sub-combination of the means responding to the resistance to rotation of the said fan embodying a cam-and-roller mechanism, the angular advance of the cam bearing a given relationship to the degree of force exerted by the first named means.

14. In a construction such as described in claim 4, the sub-combination of the said control mechanism embodying a force resisting means comprising a rotational cam acting against force-loaded rollers.

15. In a construction such as described in claim 4, the sub-combination of the said control mechanism embodying a device responsive to variations in torque of the drive to the fan.

16. In a construction such as described in claim 4, the sub-combination of the said control mechanism including a pin-and-groove connection operative upon an increase of speed to enable the fan to be driven at reduction speed ratios.

17. In a construction such as described in claim 3, the sub-combination of a spring means adapted to assist the first named means to prevent slip during variations in the speed ratio of the drive.

LESTER E. PERRINE.